Figure 3:
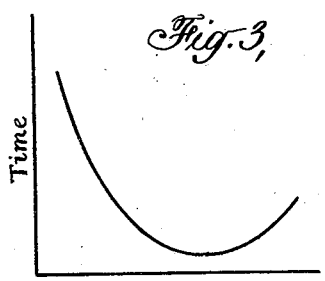
Figure 4:
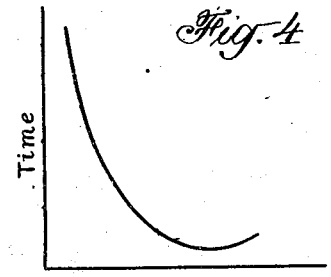
Figure 6:
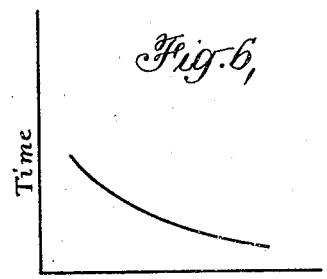

W. B. SCHULTE.
TWO SOLUTION METHOD OF PASTING.
APPLICATION FILED JUNE 10, 1920.
1,370,056.
Patented Mar. 1, 1921.
2 SHEETS—SHEET 1.
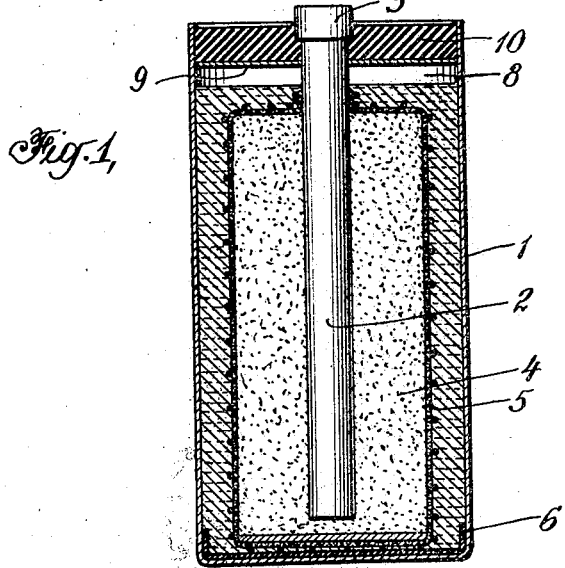
Fig. 1,
Fig. 2,
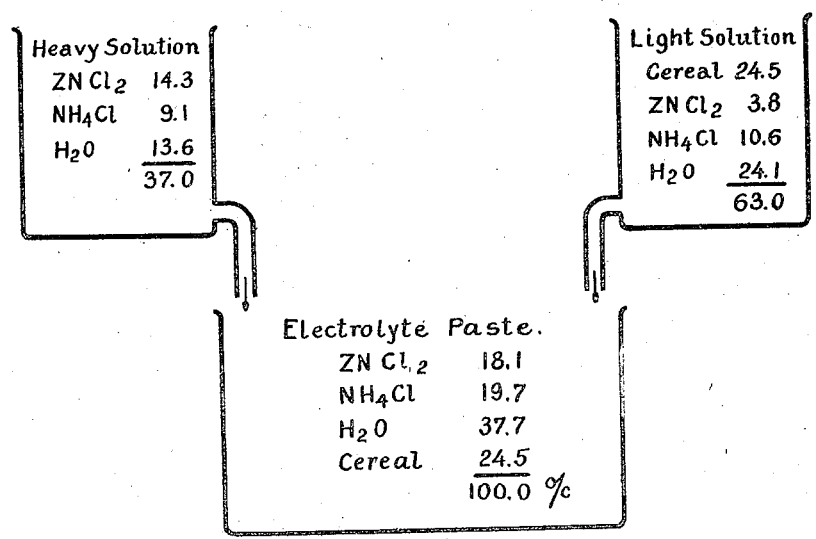
Inventor
Walter B. Schulte
By his Attorneys
Pennie Davis Marvin & Edmonds

W. B. SCHULTE.
TWO SOLUTION METHOD OF PASTING.
APPLICATION FILED JUNE 10, 1920.

1,370,056.

Patented Mar. 1, 1921.
2 SHEETS—SHEET 2.

Zinc Chloride

Ammonium Chloride

Cereal

Temperature

Age of Solution

Inventor
Walter B. Schulte
By his Attorneys
Pennie Davis Marvin & Edmonds

UNITED STATES PATENT OFFICE.

WALTER B. SCHULTE, OF MADISON, WISCONSIN, ASSIGNOR TO BURGESS BATTERY COMPANY, OF MADISON, WISCONSIN, A CORPORATION OF WISCONSIN.

TWO-SOLUTION METHOD OF PASTING.

1,370,056.

Specification of Letters Patent.     Patented Mar. 1, 1921.

Application filed June 10, 1920. Serial No. 387,952.

*To all whom it may concern:*

Be it known that I, WALTER B. SCHULTE, a citizen of the United States, residing at Madison, in the county of Dane, State of Wisconsin, have invented certain new and useful Improvements in Two - Solution Methods of Pasting; and I do hereby declare the following to be a full, clear, and exact description of the invention, such as will enable others skilled in the art to which it appertains to make and use the same.

The present invention relates to primary cells or batteries of the Le Clanche type commonly known as "dry cells," and more particularly to that species in which a gelatinized electrolyte is used.

The preferred embodiment hereinafter set forth makes use of an electrolyte of about the composition disclosed in Hambuechen U. S. Patent No. 1,292,764, issued January 28, 1919, but the steps by which the electrolyte is compounded are, in some respects, different.

With the present invention, as with that of said Hambuechen patent, the gelatinizable electrolytic paste is self-hardening, i. e., the cells need not be heated, cooked or steamed after the electrolyte has been poured in, to gelatinize the electrolyte and convert it into the relatively stiff jelly-like material desired in a dry cell.

The process herein claimed simplifies the procedure of assembling the cell, facilitates the use of automatic machinery, permits the use of strong or rich electrolytes and particularly permits a high percentage of ammonium chlorid in the electrolyte, insures the desired fluidity while pouring, gives a low internal resistance for the cell, a large output per unit of weight, prevents air bubbles in the hardened paste, decreases the expansion of the paste when the cell is under discharge, and secures other advantages in the process and in the product as will be made clear by the following detailed description of one embodiment of the invention.

In the accompanying drawing, forming a part hereof, Figure 1 is a sectional elevation of a dry cell constructed in accordance with the present invention; Fig. 2 is a flow sheet indicating the composition by two fluids suitable for use in the compounding of an electrolyte in accordance with the present invention; Figs. 3 to 7, inclusive, indicate diagrammatically the variation in time of setting with variations in other factors of the two-solution paste of Fig. 2.

In the dry cell illustrated in Fig. 1, the zinc electrode 1 is the usual seamless drawn zinc cup serving as a container for the other elements of the cell. There is a carbon rod 2 having a brass contact cap 3, this rod being enveloped in a mass of depolarizing material 4 which may consist of manganese dioxid, such as pyrolusite, recovered manganese, or the like, intimately mixed with carbonaceous material, such as graphite, retort carbon, or a mixture of these. The graphite, either wholly or in part, may be impalpable in fineness, as explained in Burgess U. S. Patents Nos. 1,162,449, November 30, 1915, and 1,211,363, January 2, 1917. Such a mixture when dampened with water, or with an aqueous solution of ammonium chlorid, or with an aqueous solution of zinc chlorid and ammonium chlorid, or their equivalents, may be molded into shape about the carbon rod 2 in a suitable tamping machine, as described in Hambuechen Patent No. 1,232,297, dated July 3, 1917, and when thus compressed into the form of a cylindrical block, with a carbon rod embedded therein, has sufficient coherence to permit handling in the factory. It may be wrapped with a bibulous envelop 5 of cheesecloth, or the like, held in place by a wrapping of thread. In assembling the cell, a disk 6 of tar paper or of paraffin paper is introduced into the zinc cup to cover its bottom and to serve as a spacer between the cathode and the zinc, and in addition thereto, or as a substitute for said spacer, the lower end of the molded cathode may be impregnated with paraffin to reduce the flow of current to the bottom of the zinc cup, etc.

In the assembly of the cell, the negative electrode or cathode, consisting of the carbon rod 2 and its fragile and preferably wrapped envelop of depolarizing mix, is lowered into the zinc cup until it rests on the bottom thereof, or on the paper spacer 6. Then the gelatinizable electrolyte in fluid condition is poured into the cup to about the relative level indicated in the drawing, and is there allowed to set or gelatinize as hereinafter explained. A gas space 8 is provided above the electrolyte, and over this is a paraffin paper washer 9 above which a suitable sealing wax, or the like, 10, is poured in to a level approximately flush with the top of the zinc container. It is to the electrolyte and the method of its compounding and use that the present invention is particularly directed. Although this electrolyte may vary some in composition, I prefer to use the materials hereinafter specified, and to compound them in approximately the relations mentioned; in this respect following the teachings of Hambuechen Patent No. 1,292,764.

I proceed by making up two solutions, as indicated diagrammatically in Fig. 2. One of these, which for convenience I have hereinafter designated the "heavy solution," may comprise zinc chlorid, ammonium chlorid and water in about the following proportions, by weight—

14.3 parts $ZnCl_2$
9.1 " $NH_4Cl$
13.6 " $H_2O$

The other solution, which for convenience I have hereinafter designated the "light solution," may comprise cereal, zinc chlorid, ammonium chlorid and water in about the following proportions by weight—

24.5 parts cereal
3.8 " $ZnCl_2$
10.6 " $NH_4Cl$
24.1 " $H_2O$

The cereal preferably consists of corn starch alone, although it can be mixed with corn meal, or replaced by other starches, such as rice flour, potato starch, and the like.

The heavy solution above described contains nearly all the ammonium chlorid it will hold. The solution does not change with age and may be stored indefinitely at room temperature without deterioration.

The light solution above described, because of its cereal content, undergoes some change, particularly during the first few minutes after compounding. The cereal or starch is kept in suspension in the mixed chlorid solution by continuous stirring, and while so suspended the starch is acted on slightly by the chlorid solution in a way to affect the time of setting of the paste or finished electrolyte made therefrom. The weak chlorid solution of the suspension acts on the starch granules in the direction of gelatinizing them, but does not quite effect gelatinization. This change in the condition of the starch takes place for the most part during the first few minutes after the cereal has been stirred into the solution, but is progressive throughout several hours at least. Consequently, it is good practice to mix up this light solution or suspension and permit it to age for several hours and for even a longer time, in order that the results from its use may be uniform, and its time of setting constant.

After compounding of the solutions above described, and preferably after aging of the light solution, I proceed by intimately mixing a small measured quantity of one solution with a small measured quantity of the other solution to form a small batch of electrolyte capable of gelatinization or self-setting without the need for cooking, steaming or heating. Taking, for instance, 37 parts by weight of the heavy solution, and 63 parts by weight of light solution, both at room temperature, I mix them together as, for instance, with an egg beater, or by jetting one solution into the other, to form a batch of 100 parts by weight. This batch is then promptly introduced into battery cups in order that no air bubbles may be entrapped on the face of either electrode or in the mass of electrolyte.

The method above described has substantial advantages over the dry cereal method of the Hambuechen patent, as follows: By having two solutions which will form a gelatinized mass promptly after being mixed with one another, it is possible to dispense and measure them automatically and with less trouble than by using one solution and a dry cereal. More intimate mixture is possible with two solutions than with a solution and a solid in the short period of time before setting takes place. Refrigeration or chilling of the components, as described by Hambuechen, is not necessary, for I have found that the starch while in suspension in the light solution is acted on sufficiently by the chlorid of that solution to have an appreciable effect on the time of setting of the paste. The weak chlorid solution of the suspension does not quite gelatinize the starch particles, but when the suspension is mixed with the heavy solution to produce the electrolyte, or paste, the strong chlorid does not act as quickly on the starch particles because of their saturation with the weak chlorid. Thus, I obtain the benefit of a retarded setting time, as described by Hambuechen, but without the inconvenience of refrigerating or chilling any of the components. However, in very warm weather, one or both of the liquors can advantageously be chilled five or ten degrees below room temperature to assist in delaying the setting during the short interval of time necessary to compound the mixture and introduce it into the cups. This cereal being in suspension, or saturated, does not have a tendency to give up gas or air and produce bubbles in the electrolyte when it sets. Dry cells made in accordance with the present method reach a high electrical conductivity immediately after setting, thereby making possible the testing of the cells shortly after manufacture, this being an improvement over present methods which require a certain aging of the cell before it can reliably be tested for current output.

Although the percentages above given for the composition of the heavy solution and of the light solution and of the mixture resulting from the addition of one to the other are the best now known to me for producing dry cells, and particularly for cells of the small sizes used in battery hand lamps, and the like, I am aware that variations in these percentages are possible without sacrificing all of the advantages of the present invention. I therefore give below results of investigations of such variations as a guide to such changes as may be made to meet special contingencies.

*Heavy solution.*

Increasing the zinc chlorid from the working value above given shortens the time of setting to a minimum, after which the time increases as indicated diagrammatically in Fig. 3. Increasing the zinc chlorid also decreases the solubility of the amonium chlorid. Decreasing the zinc chlorid lengthens the time of setting. Increasing the amount of ammonium chlorid shortens the time of setting, as indicated diagrammatically in Fig. 4, but little can be done in this direction because the heavy solution is almost saturated with ammonium chlorid under working conditions. Decreasing the ammonium chlorid lengthens the time of setting, but produces a paste having disadvantageous electrical properties.

Increasing the amount of water lengthens the time of setting, but the paste has a tendency to become thin with the cereals settling out, thereby producing undesirable electrical characteristics. Decreasing the amount of water shortens the time of setting to a certain point, after which the time increases. The decrease in water is limited by the solubility of the ammonium chlorid.

Figure 5:
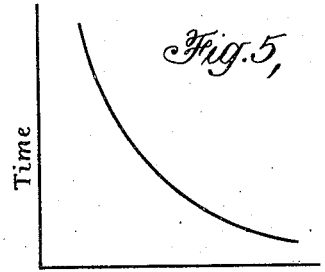
Figure 7:
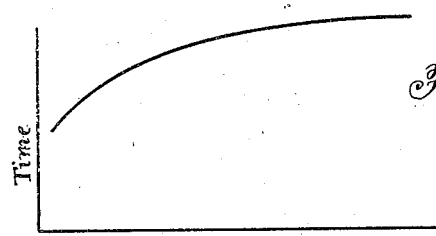

Increasing the temperature of the solutions shortens the time of setting and increases the solubility of the salts, and decreasing the temperature lengthens the time of setting and decreases the solubility of the salts, as indicated in Fig. 5.

*Light solution.*

An increase of zinc chlorid from the working values above indicated shortens the time of setting to a minimum, after which the time increases, as indicated diagrammatically in Fig. 3. Also, an increase of zinc chlorid increases the tendency of the solution to harden, and by this I mean the gelatinizing or setting of the cereal in the light solution before that solution has been mixed with the heavy solution. Decreasing the zinc chlorid lengthens the time of setting and tends to the formation of zinc oxychlorid in solution.

Increasing the ammonium chlorid from the working values above given shortens the time of setting, but is limited by its solubility in the zinc chlorid. Decreasing the ammonium chlorid lengthens the time of setting (see Fig. 4), but is not advantageous because of the poor electrical characteristics given to the cell.

Increasing the amount of water lengthens the time of setting but the paste tends to become thin and the cereals to settle out. Also, there is a tendency toward the formation of zinc oxy-chlorids in solution and poor electrical characteristics for the cell. Decreasing the amount of water shortens the time of setting.

Increasing the amount of cereal from the working values shortens the time of setting. Also, the paste becomes thicker than is necessary (see Fig. 6). Decreasing the amount of cereal lengthens the time of setting, but the paste tends to become thin with a tendency for the cereals to settle out.

As to age of the solutions, I have found that the time interval between mixing and setting lengthens during the first few hours after compounding the light solution, but thereafter the time becomes practically constant and any tendency for hardening of the light solution alone, decreases. The greatest changes in the time of setting, with age, occur during the first few minutes, during which time the cereal is being stirred into the solution and is not yet ready for use. (See Fig. 7.) As to temperature, I have found that an increase of temperature shortens the time of setting and likewise increases the solubility of the salts, and the tendency for the light solution to harden prematurely. A decrease of temperature lengthens the time of setting and decreases the solubility of salts, especially ammonium chlorid, which is easily thrown out; it also decreases the tendency of the light solution to harden prematurely. (See Fig. 5.)

The foregoing is such a full and complete disclosure of my method that it can be practised either in accordance with the embodiment particularly described herein or in accordance with such changes as may be necessary or advisable to meet special needs.

I claim:—

1. The method of preparing a dry cell electrolyte, which consists in compounding a starch suspension in a chlorid solution and subsequently adding more chlorid thereto to effect gelatinization of the electrolyte so formed, substantially as described.

2. The method of preparing a dry cell electrolyte, which consists in compounding a starch suspension in a chlorid solution and subsequently adding thereto a second solution rich enough in chlorid to effect gelatinization of the electrolyte so formed, substantially as described.

3. The method of preparing a dry cell electrolyte, which consists in compounding a starch suspension in a solution containing ammonium chlorid and zinc chlorid and subsequently adding thereto a solution rich enough in said chlorids to effect gelatinization of the electrolyte so formed, without cooking, substantially as described.

4. The method of preparing a self-hardening electrolyte for dry cells, which consists in compounding a suspension of cereal in an aqueous chlorid solution and subsequently adding thereto a second solution rich enough in chlorid to effect gelatinization at room temperature of the electrolyte so formed.

5. The method of preparing a self-hardening electrolyte for dry cells, which consists in compounding a suspension of cereal in an aqueous chlorid solution, aging said solution to permit the chlorid to act on said starch material, and subsequently adding thereto a strong aqueous chlorid solution to effect gelatinization of the electrolyte so formed.

6. The steps in the assembly of a dry cell without cooking, which consist in compounding a starch suspension in an aqueous solution of zinc and ammonia chlorid, whereby said starch material is acted on by the mixed chlorids, but not enough to effect gelatinization, and subsequently adding thereto just prior to pouring into a dry cell an aqueous solution rich enough in chlorid to effect gelatinization at room temperature of the electrolyte so produced.

7. The method of assembling a dry cell without cooking, which consists in preparing an aqueous solution containing about 3.8 parts zinc chlorid, 10.6 parts ammonium chlorid, 24.5 parts cereal, 24.1 parts water, subsequently adding to about 63 parts of the solution so formed about 37 parts of an aqueous solution containing approximately 14.3 parts zinc chlorid, 9.1 parts ammonium chlorid and 13.6 parts water, pouring the electrolyte so formed into the space between the electrodes of a dry cell to form an electrolyte therebetween, and there allowing said electrolyte to gelatinize between said electrodes at substantially room temperature.

8. A starchy suspension for use in the preparation of a gelatinizable dry cell electrolyte, comprising about 3.8 parts zinc chlorid, 10.6 parts ammonium chlorid, 24.5 parts cereal and 24.1 parts water.

In testimony whereof I affix my signature.

WALTER B. SCHULTE.